United States Patent [19]

Reu

[11] 4,221,707
[45] Sep. 9, 1980

[54] TREATMENT FOR COMMERCIAL VEGETABLE PROTEIN PRODUCTS

[76] Inventor: Donald G. Reu, 2718 Avenue N, P.O. Box 39, Fort Madison, Iowa 52627

[21] Appl. No.: 40,318

[22] Filed: May 18, 1979

Related U.S. Application Data

[63] Continuation-in-part of Ser. No. 914,973, Jul. 6, 1978, abandoned.

[51] Int. Cl.$^3$ .............................................. A23J 1/14
[52] U.S. Cl. ................................ 260/123.5; 426/634; 426/656
[58] Field of Search ..................... 260/123.5; 426/634, 426/656

[56] References Cited

U.S. PATENT DOCUMENTS 3,783,139  1/1974  Moneymaker et al. ......... 260/112 G

Primary Examiner—Howard E. Schain

[57] ABSTRACT

A treatment is disclosed for reducing the residual characteristic natural flavor present in commercial soy vegetable protein products as well as in mature soybean seeds.

The mechanism by which this particular treatment works is that a nonionic surface active agent and a dihydric alcohol, in the presence of water, using heat and pressure are brought into contact with the residual flavor oil components which are present in soybeans and in soybean derived commercial vegetable protein products at which time a coupling action takes place between the lipophilic part of the molecule of the nonionic surface active agent and residual soy flavor oil causing it to be extracted and solubilized in the processing water present by the hydrophilic part of the molecule of the nonionic surface active agent. The dihydric alcohol acts as a wetting agent to permit easier penetration of the nonionic surface active agent into the vegetable protein in order to couple with the residual flavor oil and also to facilitate easier solubilization of the coupled product into the surrounding processing water. The coupled and solubilized soy flavor oils are then decanted off along with the processing water at the end of the pressure accelerated cooking cycle. The treated soybean product is then rinsed three times with water to remove any remaining solubilized flavor residual. The treated product is a bland, hydrated, and neutral tasting product lacking the usual characteristic soy flavor.

17 Claims, No Drawings

TREATMENT FOR COMMERCIAL VEGETABLE PROTEIN PRODUCTS

This application is a continuation-in-part of application Ser. No. 914,973, filed July 6, 1978 and now abandoned.

BACKGROUND OF THE INVENTION

The present invention represents a new and unique manner of treating commercial soy vegetable protein products such as soy beans, themselves, soy protein isolates, texturized soy protein, soy protein concentrates, soy grits, and soy flours which have a residual characteristic soy flavor present as an undesirable component. This natural soy flavor is not sufficiently removed by existing manufacturing techniques using a variety of processing methods including heat, pressure, steam, or steam injection since a residual flavor always remains ever how slight it may be.

This present invention makes use of the HLB(hydrophilic-lipophilic) balance of the nonionic surface agents polysorbate 80, polysorbate 60, polysorbate 40, and polysorbate 20 where by their lipophilic nature they are capable of coupling with the natural soybean flavor oil present in soybeans and in commercial soybean products and then by their hydrophilic nature are capable of solubilizing the coupled product in the processing water present. After the processing period is completed and all of the residual soybean flavor oil present in the soy vegetable product is coupled and solubilized, the pressure can be quickly released for rapid cooling or it can be cooled slowly before opening the processing vessel and the coupled and solubilized soybean oil is decanted from the treated product followed by three tap water rinses of the treated product to remove all residual traces of coupled product along with the processing water.

Other methods admittedly exist which use heat, pressure, and steam injection to remove most of the residual natural soybean oil from the soybean or the soybean vegetable product either during its manufacture or thereafter, but none excepting this present invention use a nonionic surface active agent, specifically polysorbate 80, polysorbate 60, polysorbate 40, and polysorbate 20, for coupling, extracting, and solubilizing the residual soybean oil and use a dihydric alcohol, specifically propylene glycol for facilitating the process by its wetting action.

ORIGIN OF STARTING MATERIAL

The ideal soybean for treatment by this method is the mature, dry soybean seed and at harvest contains about 2/5 protein and 1/5 oil plus about 2/5 carbohydrate. The actual analysis according to USDA Handbook No. 8 is as follows: Protein 34.1%, Fat 17.7%, Carbohydrate 33.5%, and Fibre 4.9%.

The usual processing of the harvested soybean seed takes place in the following manner: Step 1. cleaning, Step 2. dehulling, Step 3. flaking, Step 4. extracting to remove available oil, Step 5. heating, and Step 6. cooling.

The end result is a defatted flake having a protein content of 40 to 60% (N×6.25) on a moisture free basis, fiber maximum of 3.5%, and a variable fat content. Soy flour and soy grits are produced by grinding defatted flakes. Soy grits are coarse ground products that are usually larger than 100 mesh in particle size, whereas soy flours are 100 mesh or finer in particle size.

Soy protein concentrate has a maximum protein content of 70% on a moisture free basis and it is produced from defatted soybean flakes by processes in which the protein is immobilized and the soluble sugars, mineral matters, etc., are removed. There are presently three commercial methods by which soy protein concentrates are manufactured. These methods are different in the means used to immobilize the protein and are listed as follows: (1) heat, (2) isoelectric, (3) organic solvent washes.

Edible isolated soy protein which has a minimum protein content of 90% on a moisture free basis is obtained by extracting a white flake with water or mild alkali. The protein containing mother liquor is separated from flake residue and the protein contained in the mother liquor is precipitated with food grade acid. The resulting curd is washed and spray dried as the isoelectric product or else the curd is neutralized before spray drying to produce a water dispersible product.

Texturized vegetable protein is manufactured presently by two commercial methods (1) by means of a fiber spinning or (2) by thermoplastic extrusion processes. In the spun fiber method fibers are prepared by extruding an alkaline dispersion of soy protein through spinnerettes into a coagulating bath. The resulting fibers are then stretched to impart a toughness or chewiness to the product. The thermoplastic extrusion process is less expensive to use because soy flours can be used instead of isolated soy proteins and continuous extrusion cookers similar to those used in the manufacture of of plastic resin products are ideal for the formulation of texturized vegetable protein products. In this process a mixture of soy flour, water, (flavoring and coloring optional) is subjected to heat and pressure for a predetermined time. The cooked mass is extruded into the atmosphere at a reduced pressure to allow expansion. The shape and size of the product is determined by the shape and size of the exit dies as well as the frequency that the extruded product is cut from the dies by a revolving knife. The extruded product is quite moist and requires further drying.

PREPARATION OF THE NONIONIC SURFACE ACTIVE AGENTS POLYSORBATE 80, POLYSORBATE 60, POLYSORBATE 40, AND POLYSORBATE 20.

Polysorbates 80, 60, 40, & 20 are chemically known by the names polyoxyethylene (20) sorbitan mono-oleate, polyoxyethylene (20) sorbitan monostearate, polyoxyethylene (20) sorbitan monopalmitate, and polyoxyethylene (20) sorbitan monolaurate, respectively. These nonionic surface active agents are commercially derived using sorbitol as a starting material. Sorbitol, itself, is commonly derived from glucose and by removing a mole of water is converted to 1,4 sorbitan. 1,4 sorbitan is further reacted with a fatty acid of the general formula RCOOH to produce 1,4, sorbitan monoester plus a mole of reaction water being given off. The 1,4 sorbitan monoester is treated with ethylene oxide to produce the molecule of polyoxyethylene sorbitan monoester.

The reaction mechanism can be illustrated as follows:

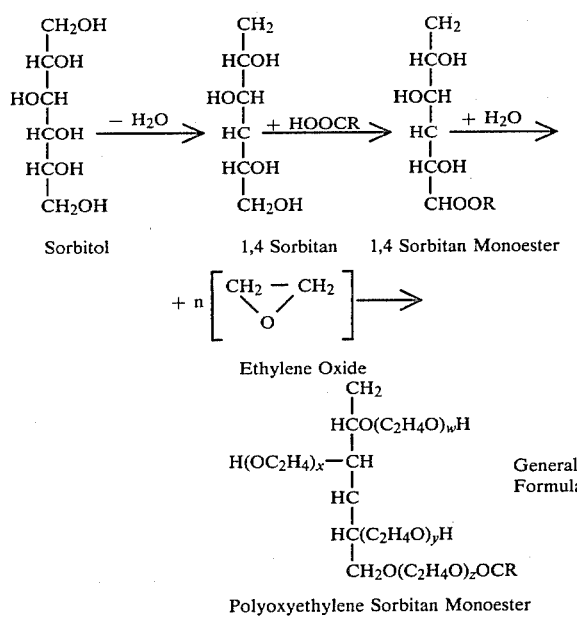

Sorbitol → 1,4 Sorbitan → 1,4 Sorbitan Monoester

Ethylene Oxide

Polyoxyethylene Sorbitan Monoester — General Formula where $n = w+x+y+z$ (number of moles of ethylene oxide added)
where RCO is the fatty acid moiety
In the terms of the specific nonionic surface active agents used in this treatment, $n=20$ moles of ethylene oxide added to the 1,4 sorbitan monoester in each instance and the fatty acid moiety is:

1. RCO=oleic acid for polyoxyethylene (20) sorbitan monooleate.
2. RCO=stearic acid for polyoxyethylene (20) sorbitan monostearate.
3. RCO=palmitic acid for polyoxyethylene (20) sorbitan monopalmitate
4. RCO=lauric acid for polyoxyethylene (20) sorbitan monolaurate.

The actual preparation of the polyoxyethylene (20) monoesters of the fatty acid moieties oleic, stearic, palmitic, and lauric can best be understood by analogy with the preparation of polyoxyethylene (10) mannitan monostearate. In this example (10) denotes the number of moles of ethylene oxide or oxyethylene units and mannitan being the isomer of sorbitan. The synthesis consists of the reaction of 10 moles of ethylene oxide with 1 mole of mannitan monostearate in the presence of sodium methylate at 100° under pressure. After the pressure returns to atmospheric, indicating the completion of the reaction, the product is blown with superheated steam at 10 mm pressure with agitation to free it from residual ethylene oxide. Such products contain oxyethylene chains attached to the site of each hydroxy group of the starting anhydrohexitol ester. The sum of all the oxyethylene chains lengths equals the average number of moles of ethylene oxide attached to each anhydrohexitol unit. The behavior of other polyoxyethylene esters as said polyoxyethylene (20) sorbitan monooleate, monostearate, monopalmitate, and monolaurate probably rearrange to the ends of the polyoxyethylene chain through transesterification during the oxyethylation reaction. The general formula of said polyoxyethylene (20) sorbitan monoesters illustrates the structure of this class. Studies of the preparation of the polyoxyethylene (20) sorbitan monoesters at temperatures of 130 to 170° indicate that the higher temperatures shorten the reaction time, but that the hydroxyl values are slightly higher than the theoretical. The sorbitol moiety of oxyethylated sorbitol derivatives does not anhydrize during esterification with fatty acids. An alternate method to explore for preparing polyoxyalkalyene surface active agents involves first oxyalkylating the polyol followed by esterifying the product with fatty acids or by using it to alcoholize fatty esters. Another method of synthesis would be to esterify polyoxyethylene (n) sorbitol (n=number of moles of ethylene oxide) with fatty acids such as oleic, stearic, palmitic, and lauric at temperatures of 180° to 210° using a stream of nitrogen or reduced pressure to remove the water formed.

PREPARATION OF THE DIHYDRIC ALCOHOL PROPYLENE GLYCOL

Propylene glycol is prepared by converting propylene to the chlorhydrin and the oxide by a process comparable to that for the production of ethylene glycol from ethylene, or by the hydration of propylene oxide recovered from the oxidation products of of natural gas hydrocarbons. Propylene glycol has also been commercially produced by the high pressure catalytic hydrogenolysis process for making higher alcohols from cocoanut oil glycerides and by fermentation of molasses. Propylene glycol is chemically known as 1,2 Propanediol and 1,2 dihydroxypropane and is structurally represented as follows:

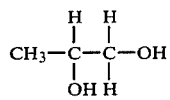

DETAILED DESCRIPTION OF THE INVENTION

The large amount of soybean oil present in the mature, dry soybean seed prevents them from being widely used as a food staple because so many people find the distinct soybean oil taste objectionable. It was hypothesized that if the soybean oil taste could be eliminated in the mature soybean seed a new source of food product would be made available as a palatable item. It was further realized that since trace amounts of residual soybean oil flavor remain in practically all known processed soy vegetable protein products that this is the factor that limits their extensive use as additives and extenders for meat products such as ground beef, hamburger, and sausage because the soy flavor becomes quite pronounced as the amount of soy protein extender is increased from 10% to higher than the 50–60% level in the respective meat product. This distinct soybean oil flavor also prevents soy vegetable products from being used at the 100% level as entirely new products by forming, pressing, cutting, shredding, grinding, and dicing into new physical forms and then flavoring and coloring appropriately. It was conjectured that some interlocking-coupling method of extracting the residual soybean flavor oil must be devised in order to reduce this prominently appearing soy flavor to virtually an undetectable level for the soy bean to be used, as is, for human consumption or in any given amount as an additive and extender for ground meat products.

Further realizing that soybean oil contains triglycerides of oleic acid, linoleic acid, linolenic acid, and saturated acids, free fatty acids, phospholipids, stigmasterol, sitosterols, and tocopherols, it was felt that continued processing with heat, steam, and/or pressure would never be sufficient to remove all of the trace chemical residuals without eventually destroying the protein itself. It was evident that a new approach was necessary and the long chain fatty acids present in polysorbate 80, 60, 40, and 20 seemed ideal for coupling and extracting the residual soybean oil present in soybeans and in commercial soy vegetable protein products and the polyoxyethylene ether linkage also present in polysorbate 80, 60, 40, and 20 seemed ideal for solubilizing the coupled products in water.

The dihydric alcohol, propylene glycol, was added as a wetting agent and solvent to assist in breaking down the interfacial surface tension existing between the soybean or soy vegetable protein and the processing water containing the nonionic surface active agent. It was felt that this would permit easier penetration of the soy product to facilitate coupling and solubilization of the soybean flavor oil by the nonionic surface active agent. The total effect would be more rapid processing time in removing the residual soybean oil from the treated soybean seed or soy vegetable protein product.

SUMMARY OF THE INVENTION

In accordance with the present invention there is provided a process for the treatment of soybeans and soy vegetable protein products with the nonionic surface active agents polysorbate 80, polysorbate 60, polysorbate 40, and polysorbate 20, respectively, and in conjunction with the dihydric alcohol, propylene glycol, under conditions of heat and pressure to product a deodorized, deflavored, bland, and practically soybean flavor free soybean product suitable for human consumption. p This discovery was made, after the theory was developed, by the following specific trails:

EXAMPLE I

One hundred twenty grams of mature dry soybeans, distributed by Now Foods, Melrose Park, Ill., was placed into a four quart pressure cooker followed by 16 ounces of tap water. Twelve grams of polyoxyethylene(20) sorbitan monooleate, Mazer Chemicals, Inc., brand name T MAZ 80, Lot 9651, Food Grade, was then added to the pressure cooker. Twelve grams of propylene glycol, distributed by Santell Chemicals, Food Grade, was added to the pressure cooker containing the soybeans, water, polyoxyethylene (20)sorbitan monooleate, the contents stirred to mix, and the heat was applied to the pressure cooker. The lid was securely fastened and when the steam began emitting from the vent, the 15 lb. pressure weight was placed over the vent, the heat turned to low and the pressure cooking continued for 4 hours with shutdowns and startups every 60 minutes to check the progress of the treatment. At the end of the fourth hour, the cooking was halted, the contents of the pressure cooker cooled, the processing water decanted off, and the cooked and treated soybeans were rinsed three times with tap water to remove all residual traces of soybean flavor remaining in the moisture surrounding the soybeans. The soybeans were tasted and found to be free of soybean flavor and resembled a regular legume such as navybeans after cooking. In consideration of the frequent shutdowns and startups of the cooking process to check the progress of the treatment it was reasoned that about 2 hours uninterrupted pressure cooking at 15 lbs. pressure would be adequate for the successful processing cycle.

A control of one hundred twenty grams of mature dry soybeans taken from the same batch of mature dry soybeans used in the former treatment example was placed into a four quart pressure cooker followed by 16 ounces of tap water, the contents of the pressure cooker swirled, and heat was applied to the cooking vessel. The lid was securely fastened and when the steam began emitting from the vent, the 15 lb. pressure weight was placed over the vent, the heat turned to low and the pressure cooking continued for two uninterrupted hours. At the end of the two hour cooking period, the pressure cooker was cooled, the processing water decanted off, and the contents were rinsed three times with tap water. It was noted that the decanted processing water was not as dark in color or flavorful with soybean taste as was the processing water from the treated example soybeans. The cooled soybeans were tasted and the soybean flavor was quite evidently present in them. The untreated beans were also darker in color indicating lack of soybean oil extraction.

EXAMPLE II

Following the general example of Example I, 120 grams of mature dry soybeans from the same batch used in Example I were placed into a four quart pressure cooker, followed by 16 ounces of tap water. Twelve grams of polyoxyethylene (20) sorbitan monostearate, Mazer Chemicals, Inc., brand name T MAZ 60, Lot 7337, was then added to the pressure cooker. Twelve grams of propylene glycol taken from the same material used in Example I was added to the pressure cooker containing the soybeans, water, polyoxyethylene (20) monostearate, the contents stirred to mix, and the heat was applied to the pressure cooker. The lid was securely fastened and when the steam began escaping from the vent, the 15 lb. weight was placed over the vent, the heat turned to low and the pressure cooking continued for two hours. At the end of the cooking cycle, the pressure cooker was cooled, the processing water was decanted off, and the soybeans rinsed three times with tap water. It was noted that the processing water was dark in color and tasted strongly of soybean flavor as did the processing water from the treated soybeans in Example I. The treated soybeans, themselves, were lighter in color than the control soybeans in Example I and when tasted they were found to be free of soybean flavor and resembled a regular legume type product such as navybeans.

The preceding two examples clearly indicate that we have established, thus far, a successful process for deflavoring soybeans.

EXAMPLE III

Following the general example of Example I, the treatment process for soybeans taken from the same batch as used in Example I and Example II, was performed in the same fashion as in Example I the only exception being that the nonionic surface active agent used was polyoxyethylene(20) sorbitan monopalmitate, Mazer Chemicals, Inc., brand name T MAZ 40, Lot 5181, and the cooking cycle was for two hours as in Example II. At the end of the cooking cycle, the pressure vessel was cooled, process water decanted off, the soybeans washed three times with tap water, and tested for absence of presence of soybean flavor. The processing water decanted off was observed to be dark in color with the strong odor and taste of soybeans whereas the treated soybeans were lighter in color than the control and lacked the characteristic flavor of soybeans. This evidence would indicate that polyoxyethylene(20) sorbitan monopalmitate (polysorbate 40) is another effective nonionic surface active agent which can be used to remove the soybean flavor oil from soybeans.

EXAMPLE IV

The process of Example I was repeated using Polysorbate 20 (the monolaurate), Mazer Chemicals, Inc., T MAZ 20, Lot 8159, for the nonionic surface active agent, all other factors being the same and the cooking/processing time being two hours as in Example II. The processing water decanted off was observed to the dark amber in color and had the odor and taste of soybeans. The thrice rinsed soybeans were light in color and lacked the flavor characteristic of soybean tasting like a bland legume in nature. This evidence would indicate that polyoxyethylene(20) sorbitan monolaurate(polysorbate 20) can be effectively used to remove the soybean oil taste from soybeans.

EXAMPLE V

Soy protein concentrate, Staley's Texturized Procon 8240, Lot TIK2080C, of the typical analysis moisture 6.0%, protein (H$_2$O free) 71.5%, fat 0.3%, crude fiber 3.5%, ash 5.3%, carbohydrate (by difference) 17.7%, was treated by placing 115 grams of this material into a four quart pressure cooker, adding 24 ounces of tap water, 3 grams of Polysorbate 80 (the monooleate), and 3 grams of propylene glycol (the latter two ingredients being from the same material as used in Example I), applying heat, securing the pressure vessel lid in place, and placing a 15 lb. pressure weight over the vent after the steam begins to emit from it, and cooking for a 30 minute cycle. At the end of the 30 minute cooking cycle, the pressure cooker is cooled, the process water decanted off, and the Procon 8240 rinsed three times with tap water. The process water was found to have a heavy soybean taste while the treated Procon 8240 soy protein concentrate, texturized type, was found to be bland and completely free of soybean flavor. This fact was in accordance with what was to be expected after the trials on soybeans, themselves.

EXAMPLE VI

The same procedure as in Example V was repeated using Staley's Mira-Tex Texturized Vegetable Protein, Lot TIG0780C, of the typical analysis protein(N×6.25) 50.0% min., fat (ether extract) 1.0%, carbohydrates 32.0%, ash 7.0%, fiber 3.0%, a 115 gram portion of Mira-Tex was processed with 3 grams of polyoxyethylene(20) sorbitan monooleate and 3 grams of propylene glycol from the same lots used in Example I. Processing water used was 24 ounces and pressure cooking time was 30 minutes. The decanted processing water was found to have a soybean flavor and the three times rinsed Mira-Tex was found to be bland and completely free of soybean flavor. This is as it was expected to be from our past trials on soybeans, themselves.

Control samples were prepared in two separate instances from Staley's Procon 8240 and Mira-Tex in the same manner as described in Example V and Example VI, respectively, with the exception that the Polysorbate 80 (the monooleate) and propylene glycol were deleted from the processing mixtures during the cooking cycle. In each instance, the processing water was noted to be lighter in color with a very faint soybean taste relative to the processing water removed from the treated Procon 8240 and Mira-Tex. The cooled and rinsed Procon 8240 could be distinguished from the treated Procon 8240 from Example V by the soybean type taste it exhibited when comparison tasted. When the Mira-Tex was comparison taste tested against the treated Mira-Tex from Example VI, it also could be noticeably distinguished by the soybean taste it contained.

EXAMPLE VII

A 230 gram portion of Central Soya's Soyfluff 200W 3040, Lot 745, soy flour was processed with 14 grams of Polysorbate 80 (the monooleate—the same material as used in Example I), and 14 grams of propylene glycol (the same material as used in Example I), using 76 ounces of tap water for a processing medium. After 15 minutes heat/pressure processing using a 15 lb. weight for the pressure vent, the mixture was cooled, the processing mixture was allowed to settle for about an hour or until most of the treated soy flour had settled to the bottom of the pressure cooker. The processing water was decanted off through Whatman No. 1 fast filter paper and when most of the processing liquid had passed through the filter paper the entire treated mass of soy flour was transferred to the filter paper and allowed to drain for 15 minutes. The treated soy flour was transferred from the filter paper to a 1 liter beaker, stirred up well with about 500 mls. of tap water, allowed to settle for about 30 minutes, and filtered again by decanting off the rinse water first followed by the whole slurry of wet soy flour. This rinse/filter procedure was done a total of three times. The processing water first decanted/filtered off was reserved for comparison with the control processing water.

The procedure previously presented for soy flour was repeated with the Polysorbate 80 (the monooleate) and propylene glycol deleted for the purpose of preparing a control sample for comparative purposes.

The processing water from the treated soy flour was darker in color than the processing water from the control soy flour and had a mild soybean taste by comparison with the practically soybean free tasting control processing water. The control and treated soy flour samples were blended about 50/50 with white all-purpose patent wheat flour, in separate trials, and comparison taste tested after being cooked into small pancake type cakes. The treated soy flour was found to have no distinguishable soybean flavor while the control soy flour did have a distinguishable soybean type flavor. This would indicate that the treatment is also effective for soy flours as it was expected to be. The typical analysis for Central Soya's Soya fluff 220W 3040 is as follows: protein (as is basis, N×6.25) 53.0%, fat (petroleum ether extractable) 1.0%, moisture 6.5%, ash 6.0%, crude fiber 3.0%.

What is claimed and desired to secure by Letters Patent is:

1. The process for reducing the residual flavor present in soybeans, soy protein concentrates, soy protein isolates, texturized soy protein, and soy flours which comprises:

treating said soy products with a nonionic surface active agent selected from a group consisting of polyoxyethylene (20) sorbitan monooleate, polyoxyethylene (20) sorbitan monostearate, polyoxyethylene (20) sorbitan monopalmitate, polyoxyethylene (20) sorbitan monolaurate in the amount of 0.1 to 10% based on the dry weight of said soy product being treated and with a wetting agent which is propylene glycol of the formula:

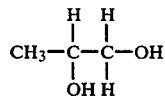

in the amount of 0.1 to 10% based on the dry weight of said soy product being treated.

2. The process as set forth in claim 1 wherein said nonionic surface active agent is polyoxyethylene (20) sorbitan monostearate.

3. The process as set forth in claim 1 wherein said nonionic surface active agent is polyoxyethylene (20) sorbitan monopalmitate.

4. The process as set forth in claim 1 wherein said nonionic surface active agent is polyoxyethylene (20) sorbitan monolaurate.

5. The process as set forth in claim 1 wherein said soy product treated is soy protein concentrate.

6. The process as set forth in claim 1 wherein said soy product treated is texturized soy protein.

7. The process as set forth in claim 1 wherein said soy product treated is soy flour.

8. The process as set forth in claim 1 wherein said soy product treated is soy protein concentrate and said surface active agent is polyoxyethylene (20) sorbitan monostearate.

9. The process as set forth in claim 1 wherein the said soy product treated is soy protein concentrate and said nonionic surface active agent is polyoxyethylene (20) sorbitan monopalmitate.

10. The process as set forth in claim 1 wherein the said soy product treated is soy protein concentrate and said nonionic surface active agent is polyoxyethylene (20) sorbitan monolaurate.

11. The process as set forth in claim 1 wherein said soy product treated is texturized soy protein and said nonionic surface active agent is polyoxyethylene (20) sorbitan monostearate.

12. The process as set forth in claim 1 wherein said soy product treated is texturized soy protein and said nonionic surface active agent is polyoxyethylene (20) monopalmitate.

13. The process as set forth in claim 1 wherein said soy product trated is texturized soy protein and said nonionic surface active agent is polyoxyethylene (20) sorbitan monolaurate.

14. The process as set forth in claim 1 wherein said soy product treated is soy flour and said nonionic surface active agent is polyoxyethylene (20) sorbitan monostearate.

15. The process as set forth in claim 1 wherein said soy product treated is soy flour and said nonionic surface active agent is polyoxyethylene (20) sorbitan monopalmitate.

16. The process as set forth in claim 1 wherein said soy product treated is soy flour and said nonionic surface active agent is polyoxyethylene (20) sorbitan monolaurate.

17. A process according to claim 1 wherein pressure cooking using 15 lbs. pressure is applied to a mixture of mature dry soybeans, processing water from 2 to 10 parts in excess of the weight of the dry soybeans, polyoxyethylene (20) sorbitan monoleate, monooleate from 5 to 10% of the weight of the dry soybeans, and propylene glycol from 5 to 10% of the weight of the dry soybeans, for a period of from 2 to 3 hours, either venting off the steam at the end of the 2 to 3 hour heat/pressure cycle to facilitate cooling or cooling slowly and releasing residual steam later, discarding the processing water mixture, and rinsing said processed soybeans at least three times with fresh water to remove all residual traces of processing water.

* * * * *